April 27, 1937.   J. W. SCHADE   2,078,777
METHOD AND APPARATUS FOR PROCESSING RUBBER
Filed Oct. 11, 1935   2 Sheets-Sheet 1
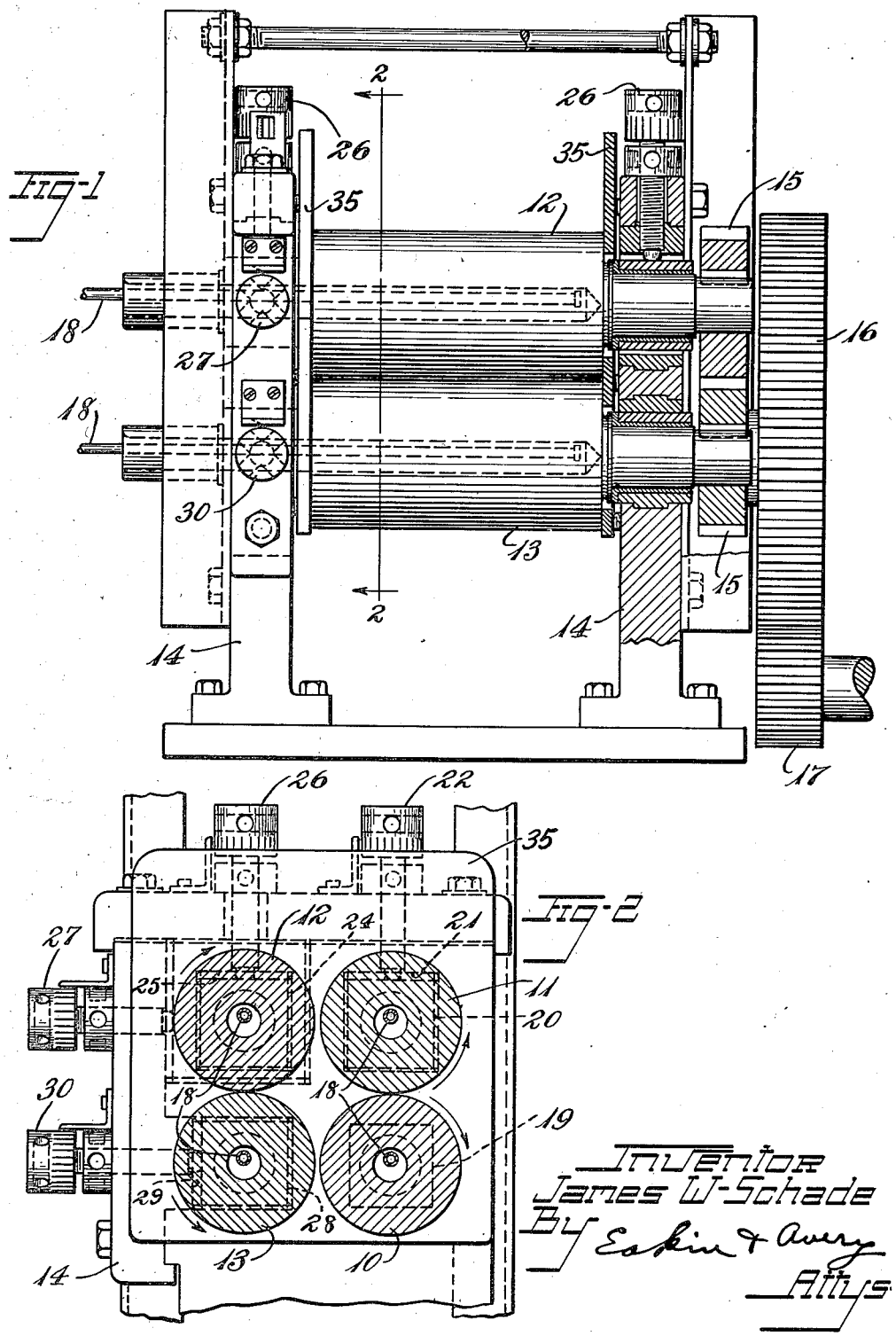

April 27, 1937.  J. W. SCHADE  2,078,777
METHOD AND APPARATUS FOR PROCESSING RUBBER
Filed Oct. 11, 1935  2 Sheets-Sheet 2
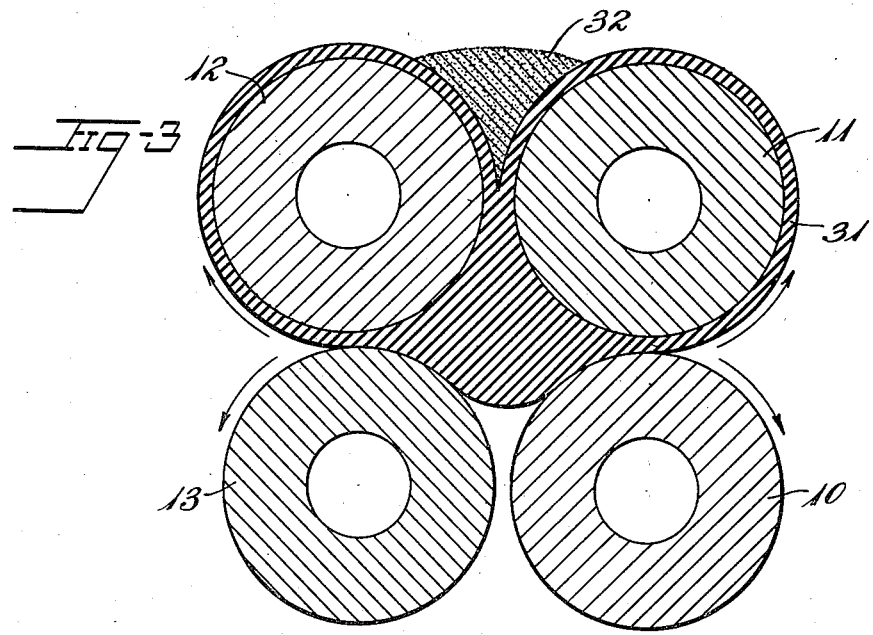
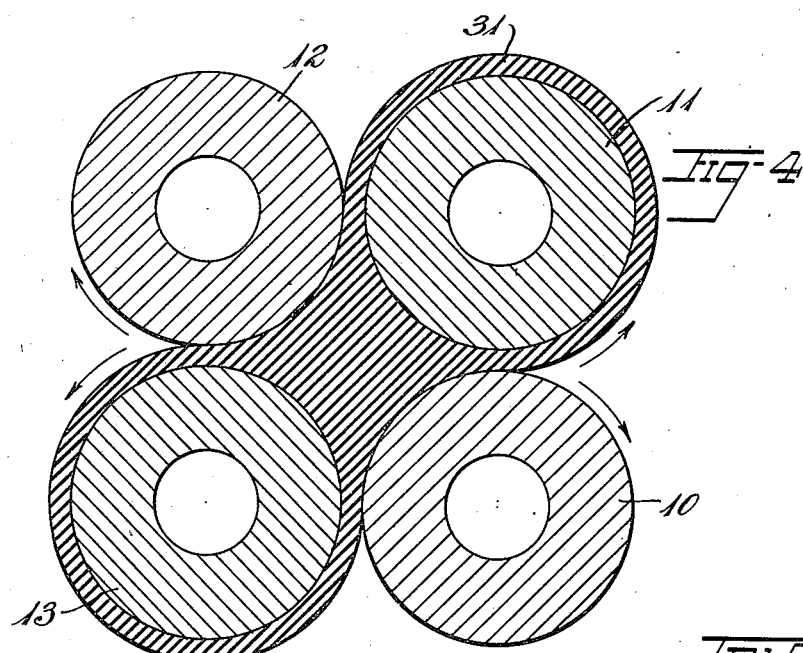
Inventor
James W. Schade
By Eakin & Avery
Attys.

Patented Apr. 27, 1937

2,078,777

UNITED STATES PATENT OFFICE 2,078,777

METHOD AND APPARATUS FOR PROCESSING RUBBER

James W. Schade, Akron, Ohio, assignor to The B. F. Goodrich Company, New York, N. Y., a corporation of New York Application October 11, 1935, Serial No. 44,630

9 Claims. (Cl. 18—2)

This invention relates to procedure and apparatus for processing rubber and especially for masticating or plasticizing crude rubber and for mixing compounding materials into the plasticized rubber.

In manufacturing rubber goods from crude solid rubber, it is necessary to subject the crude rubber to intensive mechanical kneading or working for a considerable time in order to plasticize the rubber sufficiently to permit satisfactory incorporation of necessary compounding materials and then to continue such mechanical working for an additional considerable period while the compounding materials are being added and thoroughly mixed into the rubber. These plasticizing and mixing operations for many years were carried out in the rubber industry exclusively on conventional two-roll rubber mills, and while other types of apparatus such as the "Gordon Plasticator" and the "Banbury" mixer now are used to a considerable extent, by far the greater part of the rubber still is processed on two-roll mills notwithstanding the facts that the size of batch which may be handled by a two-roll mill is relatively small, that much labor is required, especially in the "cutting back and forth" operations, and that a relatively much longer time of processing is required to effect satisfactory mixing.

Accordingly it is an object of the present invention to provide a rubber processing mill which, while retaining the advantages of the roll mill, will overcome its disadvantages in that relatively much larger batches may be plasticized and mixed in substantially less time and with little, if any, of the laborious "cutting back and forth" required on present mills, and generally to provide efficiency and economy in processing rubber.

These and other objects of the invention are attained by providing an apparatus embodying four working rolls in novel arrangement which causes the rolls to operate upon the rubber in a manner wholly unlike that of any prior apparatus of which applicant is aware, this resulting in greatly improved efficiency in processing and especially in mixing the rubber. Details of the apparatus and its mode of operation will be described with reference to the accompanying drawings of which Fig. 1 is an elevation, partially sectioned, illustrating a mill embodying the principles of this invention;

Fig. 2 is a vertical section taken on line 2—2 of Fig. 1.

Fig. 3 is a diagrammatic view illustrating a preferred mode of operating the mill of Fig. 1.

Fig. 4 is a similar view illustrating an alternative mode of operating the mill of Fig. 1.

A preferred embodiment of the invention as illustrated in Figs. 1 and 2 comprises four hollow steel mill rolls 10, 11, 12, 13 of conventional design mounted for rotation between suitable end standards 14, 14 and driven by means of four spur gears 15, a bull gear 16, and a drive pinion 17 from a source of power not shown. For cooling or heating the rolls during operation, pipes 18 for water or steam are provided extending into the interior of each of the four rolls.

The roll 10 is rotatably mounted in journal boxes 19, immovably set in the side standards 14, 14, and is driven in a clockwise direction (considered from the driven end of the roll) by the bull gear 16, which is carried on the shaft of the roll 10.

The roll 11 is rotatably mounted in journal boxes 20 directly above and in close parallel relation to the roll 10, and is driven in a counter-clockwise direction by the spur gear 15, meshing with a similar spur gear 15 on the shaft of the roll 10. The journal boxes 20 may be adjusted vertically in the slide way 21 by means of the adjusting screws 22 to vary the spacing between the rolls 10 and 11.

The roll 12 is rotatably mounted in the journal boxes 24 on a level with and in close parallel relation to the roll 11 and is driven in a clockwise direction by the spur gear 15 on its shaft meshing with the similar gear 15 on the shaft of the roll 11. The journal boxes 24 carrying the roll 12 may be adjusted both vertically and horizontally in the slide way 25, by means of the vertical adjusting screws 26 and the horizontal screws 27.

The fourth roll 13 is rotatably mounted in the journal boxes 28 directly below the roll 12, on a level with the roll 10, and in close parallel relation to both. The roll 13 is driven in a counter-clockwise direction by the spur gear 15 on its shaft meshing with the similar gear 15 on the shaft of the roll 12. The journal boxes 28 are slidable horizontally in the slide way 29 under control of the horizontal adjusting screws 30.

For confining the rubber being processed to the working surfaces of the rolls, end plates 35, 35 are provided at each end of the rolls as in usual mill practice.

For operating the mill in the preferred manner illustrated in Fig. 3, the various adjusting screws are set so that the space between the roll 10 and the roll 11 and the space between the roll 12 and the roll 13, are each equal to the thickness of rubber sheet which customarily is handled in ordinary mill practice upon rolls of the size in use, and so that the space between the upper rolls 11 and 12 is at least equal to and preferably greater than the sum of the space between the rolls 10 and 11 and the space between the rolls 12 and 13. Experience has shown that most satisfactory results are attained if the ratio of the space between the rolls 11 and 12 to the sum of the spaces between the rolls 10 and 11 and the rolls 12 and 13 is from 1.2 to 1.8. The space between the two lower rolls 10 and 13 may be slightly less than the space between the side rolls 10 and 11, and 12 and 13.

When proper roll spacing adjustments have been made, the rolls are rotated in the directions indicated at speeds comparable to present mill practice with the same size rolls, and a quantity of rubber 31 sufficient ultimately to form continuous sheets around two of the four rolls and substantially to fill the central kneading cavity gradually is fed into the bight of the upper two rolls 11 and 12, which subject the rubber to masticating pressure and carry it into the central cavity where it is intensively kneaded and extruded simultaneously between the side rolls 10 and 11, and 12 and 13. As the two sheets of rubber are extruded, they are carried respectively over the upper rolls 11 and 12 and returned to the bight between the two upper rolls. The rubber after a few minutes mastication will be plasticized sufficiently to form continuous coherent sheets about the two rolls and to travel with the rolls as shown in Fig. 3.

When the rubber has been plasticized sufficiently to receive compounding materials, such material 32 may be poured upon the converging rubber sheets in the bight of the upper rolls 11 and 12 and the mechanical working continued. The compounding material is rapidly and efficiently distributed throughout the batch of rubber and little, if any, "cutting back and forth" is required, because the compounding material is folded in between the two converging sheets of rubber and the rubber then is subjected to intensive kneading in the central cavity and then simultaneously extruded in two separate sheets. Fresh rubber surfaces are constantly presented for reception of compounding material, the entire mass of rubber undergoes continual intensive working, and no unworked uncompounded layer can remain adjacent the mill roll. In some instances, particularly if relatively long rolls are in use, it may be desirable to cut the rubber back and forth a few times, preferably near the end of the mixing operation, to insure uniformity of the mixed rubber throughout the length of the mill. When the mastication and/or mixing is completed, the rubber may be cut from the mill in strips as in usual milling practice.

The efficiency of the present four-roll mill in mixing compounding materials into rubber may be readily shown by cutting samples from the rubber at various stages of the mixing upon the present mill and upon a conventional two-roll mill. On the two-roll mill, when the compounding material has been completely worked into the rubber, there still remains adjacent the mill roll a layer of rubber of substantial thickness containing practically no compounding material. This condition continues even though the milling be prolonged, and it necessitates the familiar repeated "cutting back and forth" operation to secure satisfactory distribution of the compounding material in the rubber. On the present four-roll mill, however, it is found that the compounding material appears in the rubber adjacent the mill rolls almost immediately after addition of the material to the rubber, and that the operation of "cutting back and forth" consequently may be almost entirely dispensed with.

Tests upon four-roll mills and two-roll mills of comparable size show that the four-roll mill is capable of mixing several times the weight of rubber composition per unit of time that may be mixed upon the comparable two-roll mill. The greater capacity of the four-roll mill permits the processing of much larger batches; the mill almost entirely eliminates the "cutting back and forth" operation; and the job of recovering compounding material which falls from the rolls to the mill pan and returning it to the mill is almost eliminated, one such operation usually being sufficient; all of which contributes to effect great economies as well as efficient mixing of the rubber composition.

Modifications of the apparatus and procedure hereinabove described are possible. For example, instead of directing both the extruded sheets of rubber up over the top mill rolls, one of the two sheets may be directed around a lower roll to cause the rubber to travel around two diagonally opposed rolls as shown in Fig. 4. In this case, compounding material may be introduced between the roll 12 and the rubber on the roll 11 more nearly as in present practice. The invention is not limited to the use of rolls all of the same size as in the preferred embodiment illustrated in the drawings, but is capable of variation in this respect, and the rolls may all be operated at the same surface speeds, or adjacent rolls may be operated at differential speeds as in many mills now used. Suitable means for simultaneously changing the spacings between the various rolls obviously may be provided. All such modifications and variations both in apparatus and procedure are within the scope of my invention as defined by the appended claims.

I claim:

1. The method of processing rubber which comprises subjecting a mass of the rubber to intensive mechanical kneading in a confined space, simultaneously extruding two continuous sheets of rubber from said confined space and continuously returning the extruded sheets to the mass within the confined space.

2. The method of processing rubber which comprises subjecting a mass of the rubber to intensive mechanical kneading in a confined space, simultaneously extruding two continuous sheets of rubber from said confined space, bringing the extruded sheets together under pressure and returning the combined sheets to the mass within the confined space.

3. The method of processing rubber which comprises subjecting a mass of the rubber to intensive mechanical kneading in a confined space, simultaneously extruding two continuous sheets of rubber from said confined space, continuously returning the extruded sheets to the mass within the confined space and pressing compounding material into at least one of the two rubber sheets as it is being returned to the mass.

4. The method of mixing compounding material into rubber which comprises subjecting a mass of the rubber to intensive mechanical kneading in a confined space, simultaneously extruding two continuous sheets of rubber from said confined space, bringing the extruded sheets into converging relation under pressure, introducing compounding material between the two sheets adjacent the line of their convergence, and continuously returning the combined sheets and contained compounding material to the mass of rubber within the confined space.

5. The method of mixing compounding material into rubber which comprises plasticizing the rubber, forming the plastic rubber into two sheets, bringing the two sheets into converging relation, introducing compounding material between the sheets adjacent the line of their convergence, subjecting the converged sheets to pressure, and kneading the converged sheets and contained compounding material.

6. The method of processing a plastic material having substantially the properties of rubber, which comprises subjecting a mass of the plastic material to intensive kneading in a substantially confined space defined by a group of more than three rolling surfaces, simultaneously extruding at least two strips of plastic material from said space and between pairs of said rolling surfaces, and continuously returning substantially all the extruded material to the mass within the confined space.

7. A roll mill for processing plastic materials, comprising four rolls rotatably mounted in parallel relation with their axes at corners of a quadrangle so that each roll is contiguous to two only of the other rolls, and driving means so constructed and arranged as to rotate two diagonally opposed rolls in one direction and the other two diagonally opposed rolls in the opposite direction, so that in each pair of contiguous rolls the rolls rotate in opposite directions.

8. A roll mill for processing plastic materials, comprising four rolls rotatably mounted in parallel relation with their axes at corners of a quadrangle so that each roll is contiguous to two only of the other rolls, a gear train comprising a gear on each roll intermeshing with a similar gear on a contiguous roll, and driving means for rotating one of the rolls.

9. A roll mill for processing plastic materials, comprising four rolls of substantially the same size rotatably mounted in parallel relation with their axes approximately at the corners of a square so that each roll is contiguous to two only of the other rolls, the ratio of the space between two of the rolls to the sum of the spaces between each of said two rolls and the rolls contiguous thereto being from 1.2 to 1.8, and driving means so constructed and arranged as to rotate two diagonally opposed rolls in one direction and the other two diagonally opposed rolls in the opposite direction, so that in each pair of contiguous rolls the rolls rotate in opposite directions.

JAMES W. SCHADE.